(No Model.)

J. J. BOWEN.
BAND SAWING MACHINE.

No. 336,693. Patented Feb. 23, 1886.

UNITED STATES PATENT OFFICE.

JOHN J. BOWEN, OF SAN FRANCISCO, CALIFORNIA.

BAND SAWING-MACHINE.

SPECIFICATION forming part of Letters Patent No. 336,693, dated February 23, 1886.

Application filed December 24, 1885. Serial No. 1 6,658. (No model.)

*To all whom it may concern:*

Be it known that I, JOHN JOSEPH BOWEN, of the city and county of San Francisco, State of California, have invented an Improvement in Band Sawing-Machines; and I hereby declare the following to be a full, clear, and exact description of the same.

My invention relates to certain improvements in the operating of band-saws; and it consists in the employment of a supplemental driving-belt extending between the upper and lower pulleys of the saw, said belt being deflected inwardly upon one or both sides at points between the pulleys, and having a tightening and compensating mechanism by which the tendency of the upper pulley to overrun will be checked, the two pulleys caused to run more completely in unison.

Figure 1:
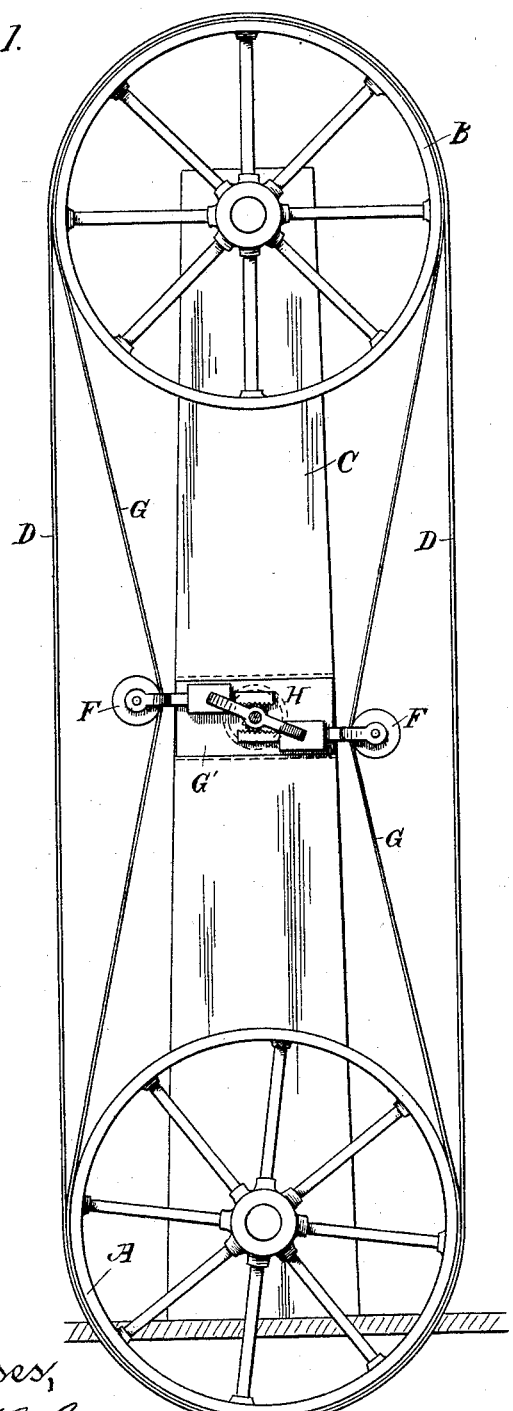
Figure 2:
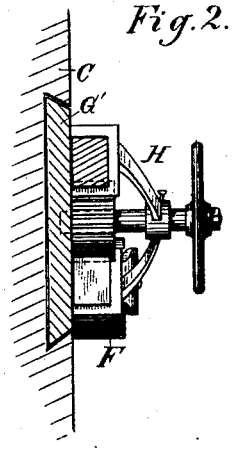

Referring to the accompanying drawings for a more complete explanation of my invention, Figure 1 is an elevation showing the front view of the band wheels or pulleys with the belt, the saw, and compensating tightening-pulleys. Fig. 2 shows the tightening device.

In the construction of band sawing apparatus the lower pulley or wheel is usually driven by any suitable gearing, and the saw passing around this wheel extends upward, passing around a similar wheel at the top, which it also acts to drive, so that the two rotate and carry the saw. In order to give the saw sufficient hold and also to cushion it properly, the faces of the wheels are usually covered with leather or some similar elastic substance; but this wears out rapidly and must be replaced at considerable expense of time and money. The saw is subjected to very considerable and irregular strains by reason of the tendency of the upper pulley to overrun or run faster than the lower one, especially in large saws where the pulleys are eight or ten feet in diameter. In order to overcome this difficulty, I have devised my present invention.

A is the lower and B the upper wheel or pulley around which the saw is to pass, being properly supported upon a standard, C. The lower wheel is driven by any suitable arrangement of gearing or pulleys, these being already well known.

D is the saw, which passes around the two wheels or pulleys.

G is a belt, which passes around these pulleys beneath the saw and serves to drive the upper pulley, thus relieving the saw of this strain. In order to deflect this belt, so as to allow the log or lumber which is being sawed to pass between it and the saw, I employ a pulley, F, around which the belt may pass, upon one side only, if desired. I have, however, found it best to employ two of these pulleys, and to deflect the belt inwardly from the saw upon both sides. These pulleys F are supported upon a frame, G', which slides in suitable guides mounted upon the standard of the upper wheel, and there is also an adjusting device, H, fixed to the supports of the pulleys F, by which they may be drawn nearer together or moved farther apart to regulate the tension upon the belt. This belt, being made of leather, rubber, or other flexible material, serves as a cover for the pulleys, so that no other cover is necessary to be fixed upon them, the saw running over the exterior of the belt at both ends.

By deflecting the belt inwardly upon each side it increases the wrap of the belt around the pulley, and therefore decreases the tendency to slip, giving it more frictional hold.

In running large saws where the pulleys are eight or ten feet in diameter, the latter are of considerable weight, and after arriving at a high speed, if the saw is made to run slower as it enters the lumber, the upper wheel is apt to overrun the lower one, which causes the saw upon that side to become slackened and interferes with its work, and has a tendency to cause it to break. By the use of the supplemental driving-belt with the deflecting and driving pulleys this fault is corrected, as the belt holds the upper pulley, and any tendency of the pulley to overrun will cause the frame which supports the deflecting-pulleys to move transversely in its guides, thus keeping both sides of the belt equally tight and preventing this difficulty.

Having thus described my invention, what I claim as new, and desire to secure by Letters Patent, is—

1. The pulleys or wheels having a band-saw passing around them, in combination with a supplemental driving-belt passing around the pulleys beneath the saw and having one or both sides deflected or carried away from the saw at points intermediate between the pulleys, substantially as herein described.

2. The pulleys carrying the band-saw and having a supplemental driving-belt passing around them beneath the saw, in combination with secondary pulleys so mounted as to deflect the sides of the belt toward each other between the saw-carrying pulleys, substantially as herein described.

3. In combination with the saw-carrying pulleys, a supplemental belt passing around the pulleys beneath the saw, deflecting-pulleys by which the sides of the supplemental belt are brought toward each other between the main pulleys, and a guide upon which the secondary pulleys are mounted so as to have a transverse motion, substantially as and for the purpose herein described.

4. The main saw-carrying pulleys having a supplemental flexible belt passing around them beneath the saw, deflecting-pulleys by which the sides of the belt are carried inwardly and away from the saw between the main pulleys, a guide or guides upon which the secondary pulleys are supported so as to have a transverse motion, and an adjusting mechanism by which the tension of the belt may be regulated, substantially as herein described.

In witness whereof I have hereunto set my hand.

JOHN J. BOWEN.

Witnesses:
S. H. NOURSE,
H. C. LEE.